(12) United States Patent
Silvestro

(10) Patent No.: US 6,969,824 B2
(45) Date of Patent: Nov. 29, 2005

(54) LOCKING DEVICE FOR LATCH ASSEMBLY

(75) Inventor: Nino Silvestro, Independence, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 33 days.

(21) Appl. No.: 10/621,087

(22) Filed: Jul. 16, 2003

(65) Prior Publication Data

US 2005/0011875 A1    Jan. 20, 2005

(51) Int. Cl.[7] .............................................. B23K 9/10
(52) U.S. Cl. ................................................... 219/133
(58) Field of Search ............................... 219/133, 134; 290/1 R, 1 A; 70/78–84, 203, 208, 210–212; 292/121, 122, 129, 285

(56) References Cited

U.S. PATENT DOCUMENTS

| | | | | |
|---|---|---|---|---|
| 1,592,405 A | * | 7/1926 | Worley, Jr. et al. | ............. 70/81 |
| 3,740,978 A | * | 6/1973 | Smith et al. | ................... 70/100 |
| 4,365,831 A | * | 12/1982 | Bourne | ........................ 292/229 |
| 5,664,448 A | * | 9/1997 | Swan et al. | .................... 70/224 |
| 6,606,889 B1 | * | 8/2003 | Tweedy | ........................ 70/208 |

* cited by examiner

Primary Examiner—Kevin P. Kerns
(74) Attorney, Agent, or Firm—Fay, Sharpe, Fagan, Minnich & McKee, LLP

(57) ABSTRACT

A door and latch assembly for use on an electric arc engine welder is provided. The door and latch assembly includes a door mounted on an associated arc engine welder housing. The door is movable between a door open position wherein an associated opening on the associated housing is accessible and a door closed position wherein the door covers the associated opening. A latch is pivotally mounted on the door. The latch is movable between a latch closed position wherein the latch locks the door in the door closed position and a latch open position wherein the door is movable toward the door open position. A locking device is on the door. A locking device locks the latch in the latch closed position when the locking device is enabled and allows the latch to move from the latch closed position toward the latch open position when the locking device is disabled.

26 Claims, 3 Drawing Sheets

LOCKING DEVICE FOR LATCH ASSEMBLY

BACKGROUND OF THE INVENTION

1. Field of the Invention

The present invention relates to a latch assembly and, more particularly, to a locking device for a latch assembly. The present invention finds particular application as a locking device for a latch and door assembly on an electric arc engine welder and will be described with particular reference thereto. However, it is to be appreciated that the present invention may relate to other similar environments and applications.

2. Discussion of the Art

U.S. Pat. No. 4,365,831 of Bourne, expressly incorporated herein by reference, discloses a latch assembly for use in applications where the latched surface is subjected to pressure and acceleration loading. In particular, the '831 latch assembly includes a latch that partially resists inadvertent opening of the latch due to pressure and/or acceleration loading while remaining easy to open when it is desirable to do so. It is known to employ the '831 latch assembly for use on electric arc engine welders.

One problem with the '831 latch assembly is that it can inadvertently open due to pressure and/or acceleration loading if either of these are applied in a specific location of the latch. Further, the '831 latch assembly does not prevent unauthorized or undesirable opening of the latch by individuals. Accordingly, there is a need for a latch assembly that includes a locking device and, in particular, a latch assembly With a lock device for use on an electric arc engine welder.

SUMMARY OF THE INVENTION

The present invention provides a new and improved locking device for a latch assembly that overcomes the foregoing difficulties and others and provides the aforementioned and other advantageous features. More particularly, in accordance with one aspect of the invention, a door and latch assembly for use on an electric arc engine welder is provided. In accordance with this aspect of the invention, the door and latch assembly includes a door mounted on an associated arc engine welder housing. The door is movable between a door open position wherein an associated opening on the associated housing is accessible and a door closed position wherein the door covers the associated opening. A latch is pivotally mounted on the door. The latch is movable between a latch closed position wherein the latch locks the door in the door closed position and a latch open position wherein the door is movable toward the door open position. A locking device is on the door. The locking device locks the latch in the latch closed position when the locking device is enabled and allows the latch to move from the latch closed position toward the latch open position when the locking device is disabled.

In accordance with another aspect of the present invention, a door and latch assembly for use on an electric arc engine welder is provided. More particularly, in accordance with this aspect of the invention, the door and latch assembly includes a door mounted on an associated arc engine welder housing. The door is movable between a door open position wherein an associated opening on the associated housing is accessible in a door closed position wherein the door closes the associated opening. A latch is rotatably mounted on the door and includes a latch biasing member and a housing engagement portion. The latch biasing member urges the latch to rotate in a latch first direction. The housing engagement portion limits movement of the door from the door closed position to the door open position.

A latch trigger is rotatably mounted on the door and includes a latch trigger biasing member and a door engaging portion. The latch trigger biasing member urges the latch trigger to rotate in a latch trigger first direction. The door engaging portion limits movement of the latch trigger in the latch trigger first direction. The latch trigger engages the latch and limits movement of the latch in the latch first direction. The latch trigger is movable in a latch trigger second direction against the urging of the latch trigger biasing member when a sufficient force is applied to the latch trigger whereby the latch trigger disengages the latch and allows movement of the latch in the latch first direction. A locking device is connected to the door limiting movement of the latch in the latch first direction. The locking device is capable of being disabled whereby the locking device allows movement of the latch in the latch first direction. When the locking device is disabled and the latch trigger is disengaged from the latch, the latch biasing member moves the latch in the latch first direction such that the housing engagement portion allows movement of the door from the door closed position to the door open position.

In accordance with yet another aspect of the present invention, an electric arc engine welder is provided. More particularly, in accordance with this aspect of the invention, the electric arc engine welder includes a housing having a cavity therein. A housing opening is defined by the housing and connects to the cavity. A door is mounted to the housing adjacent the housing opening. The door is movable between a door closed position wherein the door closes the housing opening and a door open position wherein the cavity is accessible through the opening. A latch is pivotally mounted on the door. The latch is movable between a latch closed position wherein the latch locks the door in the door closed position and a latch open position wherein the door is movable toward the door open position. A locking device is adjacent the latch. The locking device locks the latch in the latch closed position when the locking device is enabled and allows the latch to move from the latch closed position toward the latch open position when the locking device is disabled.

In accordance with still another aspect of the present invention, a door and latch assembly is provided. More particularly, in accordance with this aspect of the invention, the door and latch assembly includes a door operatively connected to a housing for providing access into the housing when the door is moved toward a door open position. The latch is pivotally mounted on the door. The latch is movable between a latch closed position and a latch open position. A latch trigger is pivotally mounted on the door. The latch trigger is movable between a latch trigger first position wherein the latch trigger maintains the latch in the latch closed position and a latch trigger second position wherein the latch is allowed to move from the latch closed position to the latch open position. A locking device is adjacent the latch for obstructing movement of the latch when the locking device is enabled and preventing the latch from moving to the latch open position from the latch closed position.

In accordance with still yet another aspect of the present invention, a latch assembly is provided. More particularly, in accordance with this aspect of the invention, the latch assembly includes a latch adapted for pivotal movement about a first pivot pin and includes a latch engagement portion. The latch is movable from a latch closed position to a latch open position. A latch trigger is adapted for pivotal movement about a second pivot pin and includes a latch trigger engagement portion for selectively engaging the latch engagement portion. The latch trigger is movable between a latch trigger first position wherein the latch trigger engagement portion engages the latch engagement portion and a latch trigger second position wherein the latch trigger engagement portion is disengaged from the latch engagement portion. The latch trigger urges the latch toward the latch closed position when the latch trigger engagement portion engages the latch engagement portion. A locking device is provided for selectively blocking movement of the latch from the latch closed position to the latch open position when the locking device is enabled.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
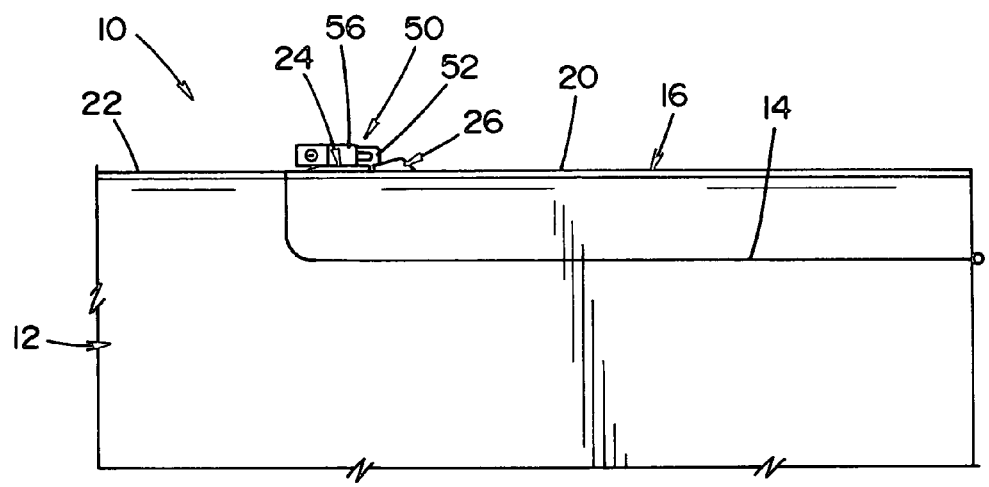
FIG. 1 is a partial side elevational view of an electric arc engine welder having a latch assembly with a locking device in accordance with a preferred embodiment of the present invention.

Referring now to the drawings wherein the showings are for purposes of illustrating the preferred embodiment of the invention only and not for purposes of limiting the same, FIG. 1 shows an electric arc welder engine generally designated by reference numeral 10. The welder engine 10 includes a housing 12 having a cavity therein for operatively receiving components (not shown) of the engine arc welder. The housing 12 defines a housing opening 14 connected to the cavity for providing access thereto. A door or cover 16 is pivotally mounted to the housing 12 adjacent the opening 14 for selectively providing access into the housing 12 for one or more of the components of the engine welder 10 contained therein. For example, the door 16 could be mounted to the housing 12 adjacent a radiator of the engine welder 10 for providing access to the radiator when maintenance, repair or replacement of the radiator is necessary.

Figure 2:
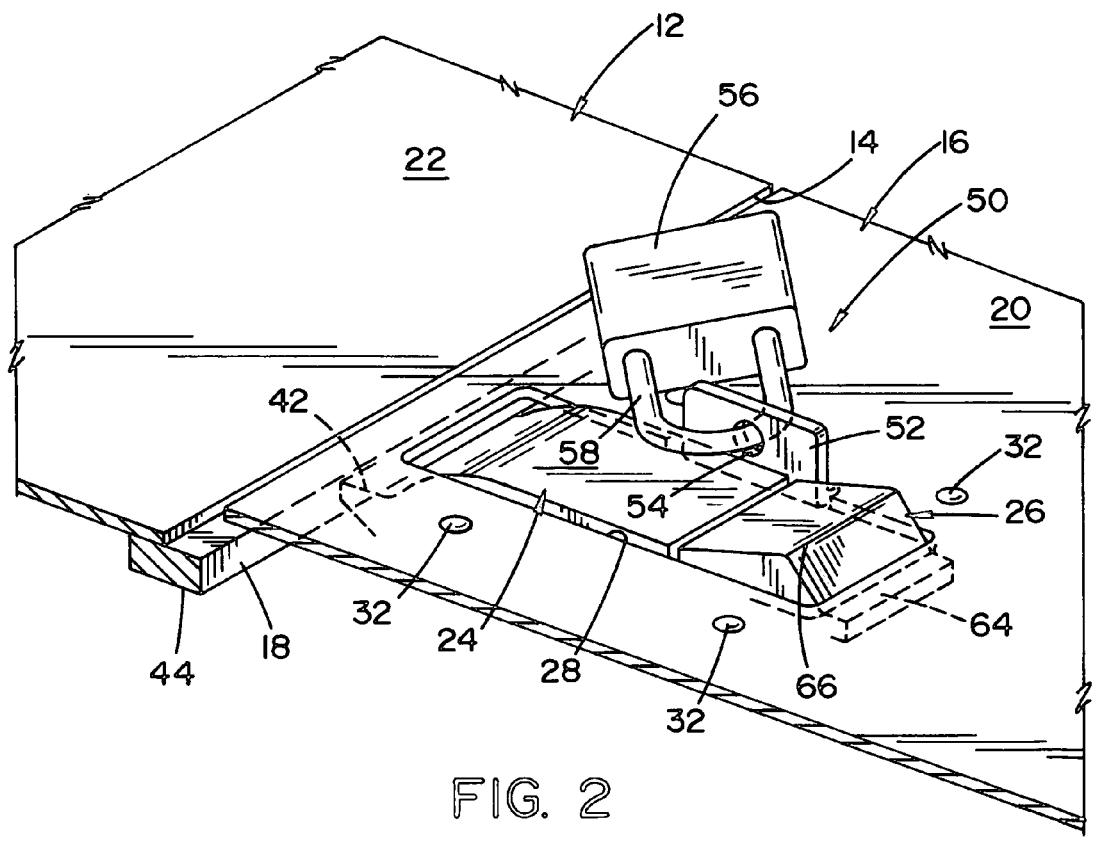
FIG. 2 is a partial perspective view of the electric arc engine welder of FIG. 1.

With additional reference to FIG. 2, the door 16 is shown in a door closed position wherein the door rests against a flange member 18 of the housing 12 and the opening 14 is closed or covered. In this position, an outer surface 20 of the door 16 is contiguous with an outer surface 22 of the housing 12. The door 16 is movable to a door open position whereby access is provided into the housing 12 to the cavity. A latch assembly includes a latch 24 that is pivotally mounted to the door 16 and serves as a graspable structure for moving the door between the door closed and door open positions. As will be described in more detail below, the latch assembly resists inadvertent opening of the door due to pressure and/or acceleration loading while remaining relatively easy to open when it is desirable to do so.

The latch assembly further includes a latch trigger 26 pivotally mounted on the door 16. More specifically, both the latch 24 and the latch trigger 26 are received in an opening 28 defined in the door 16. With additional reference to FIGS. 3 and 4, the latch assembly further includes a latch assembly housing 30 (FIG. 3) that rotatably supports the latch 24 and the latch trigger 26. The latch assembly housing 30 is mounted or secured to the door 16 by a plurality of fasteners such as bolts 32. Of course, any other fastener or connection could be used to attach the latch assembly housing 30 to the door 16 including, without limitation, a weld connection, an adhesive connection, rivets, etc.

The latch assembly housing 30 supports a first pivot pin 34 in fixed relation relative to the door 16. The latch 24 is pivotally mounted for rotation about the first pivot pin 34. The latch 24 is movable between a first, latch closed position (shown in FIG. 4) and a second, latch open position (shown in FIG. 5). A first biasing member such as latch spring 36 urges the latch 24 in a first latch direction (counterclockwise in FIGS. 4–6) toward the latch open position. In the preferred embodiment the spring 36 is a torsion spring mounted about the first pivot pin 34. The latch assembly housing 30 further supports a second pivot pin 38 in fixed relation relative to the door 16. The latch trigger 26 is pivotally mounted for rotation about the second pivot pin 38. The latch trigger 26 is movable between a first, latch trigger closed position (shown in FIG. 4) and a second, latch trigger open position (shown in FIG. 6). A second biasing member such as latch trigger spring 40 urges the latch trigger 26 in a first latch trigger direction (counterclockwise in FIGS. 4–6) away from the second, latch trigger open position. Like the spring 36, the spring 40 is a torsion spring and is mounted about the second pivot pin 38.

The latch 24 includes a first shoulder portion 42, also referred to herein as a housing engagement portion, that is adjacent the flange member 18 of the housing 12 when the latch is in the latch closed position to prevent the door 16 from opening. More particularly, the shoulder portion 42 is positioned adjacent an interior side 44 of the flange member 18. With the latch 24 in the latch closed position, the shoulder portion 42 is prevented or obstructed from passing the flange member 18 which is necessary to pivotally move or open the door 16. Thus, when the latch 24 is in the latch closed position, it locks the door in a door closed position. When the latch is in the latch open position, the shoulder portion 42 moves away from the flange member 18 which allows the door 16 to be moved toward or to a door open position.

With reference back to FIG. 2, the latch assembly further includes a locking device 50 adjacent the latch 24. The locking device 50 includes an attaching structure such as a flange or tab 52 extending upwardly from the door 16 at a location generally adjacent the opening 28 and having a throughhole 54. The locking device 50 further includes a lock 56 releasably secured to the attaching structure 52. More particularly, the lock 56 is insertable into the throughhole 54 of the tab 52. In the preferred embodiment, the lock 56 is a conventional key-type padlock having an arm 58 receivable in the throughhole 54. When the arm 58 is received in the throughhole 54 and, optionally, the lock 56 is locked, the locking device 50 is enabled. When the arm 58 and the lock 56 are removed from the throughhole 54, the locking device is disabled.

Figure 4:
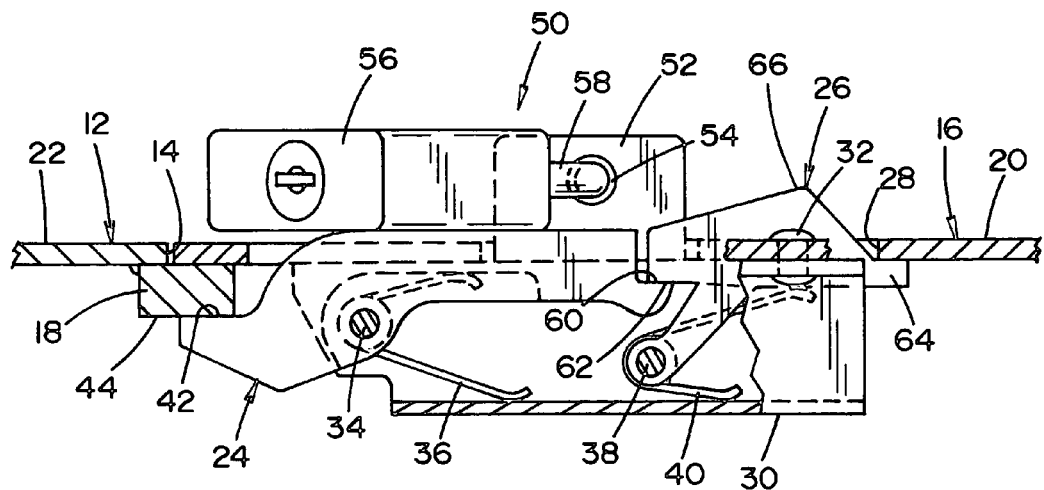
FIG. 4 is a partial cross-sectional view of the electric arc engine welder taken along the line 4—4 of FIG. 3.
Figure 5:
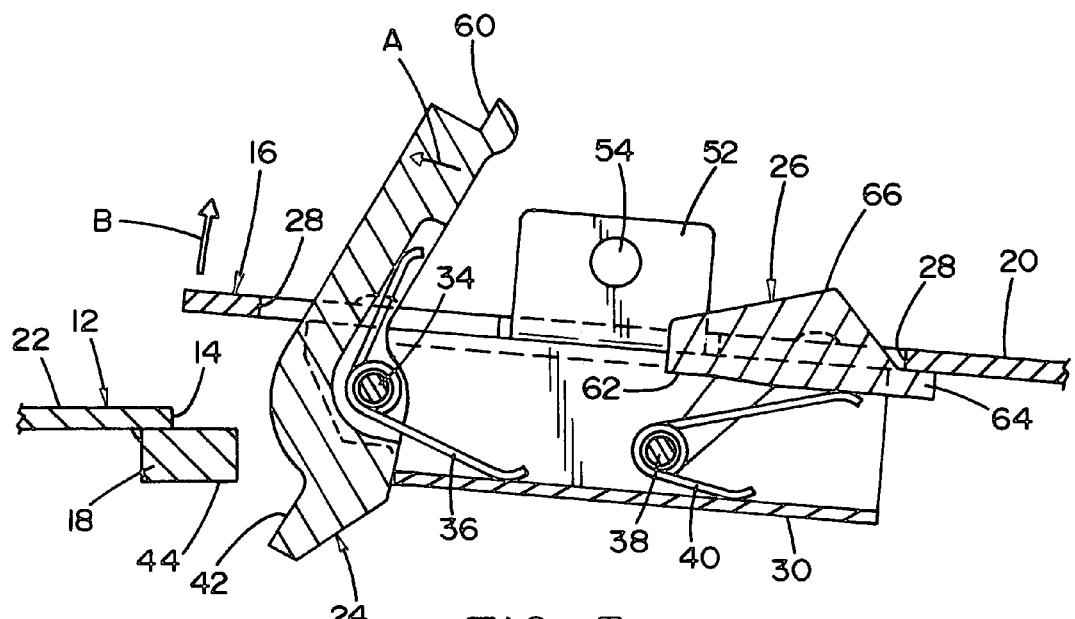
FIG. 5 is a partial cross-sectional view of the electric arc engine welder of FIG. 1 showing the locking device in a nonobstructing position and a latch of the latch assembly in an open position.
Figure 6:
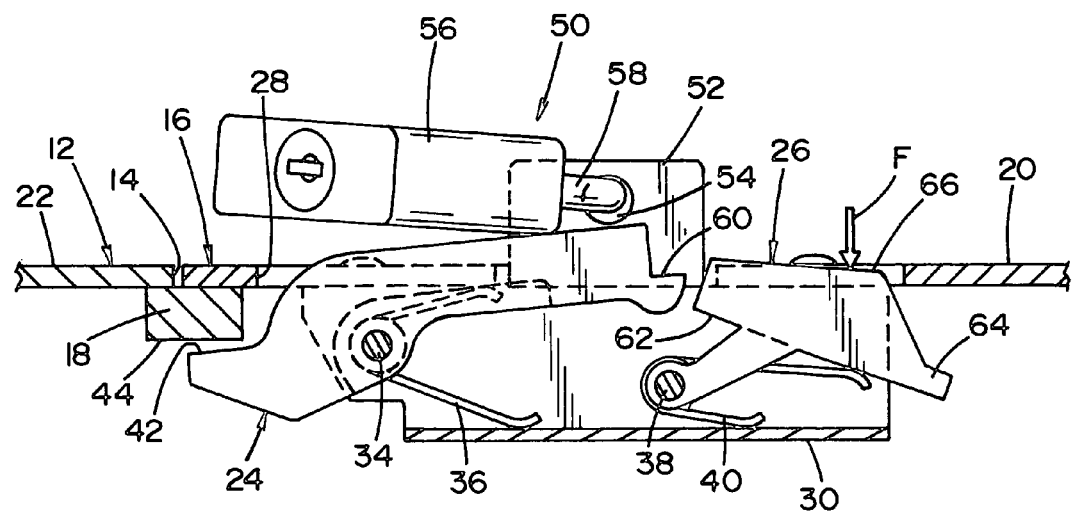
FIG. 6 is a partial cross-sectional view of the electric arc engine welder of FIG. 1 showing the locking device in an obstructing position wherein the latch is prevented from moving toward its open position.

With additional reference to FIGS. 4–6, when the locking device 50 is enabled, the locking device 50 locks the latch 24 in the latch closed position, i.e., the latch is limited or prevented from moving to the latch open position. More particularly, the lock 56 obstructs movement of the latch 24 and does not allow the latch 24 to move from the latch closed position to the latch open position. As already described, when the latch 24 is in the latched closed position, the door is prevented from opening. Thus, when the locking device 50 locks the latch 24 in the latch closed position, the locking device 50 also prevents the door 16 from being opened. When the locking device 50 is disabled, the latch 24 is allowed, or at least not prevented by the lock 56, from moving from the latch closed position to the latch open position.

The latch 24 further includes a second shoulder portion 60 that engages or abuts a lower side 62 of the latch trigger 26 when the latch is in the latch closed position and the latch trigger 26 is in the latch trigger first position. Through the engagement between second shoulder portion 60 and the lower side 62 of the latch trigger 26, the latch trigger 26 maintains the latch 24 in the latch closed position. When the latch trigger 26 is moved to the second latch trigger position, the shoulder portion 60 no longer engages the lower side 62 of the latch trigger and, thus, the latch is allowed, at least by the latch trigger, to move from the latch closed position to the latch open position.

More particularly, the spring 36 urges the latch 24 to rotate (counterclockwise in FIGS. 4–6) about the first pivot pin 34 which causes the shoulder portion 60 to exert a force against the underside 62 of the latch trigger 26. Concurrently, the spring 40 urges the latch trigger 26 to rotate (counterclockwise in FIGS. 4–6) about the second pivot pin 38 which causes the underside 62 to exert a force against the shoulder portion 60 of the latch 24. The force exerted by the underside 62 is generally greater than the force exerted by the shoulder portion 60 which prevents the latch 24 from moving toward its open position. The latch trigger 26 includes a flange portion 64, also referred to herein as a door engaging portion, that is urged against the door 16 by the spring 40. The flange portion 64 prevents the latch trigger 26 from moving the latch 24 beyond the position shown in FIG. 4.

To open the latch assembly, with reference to FIG. 6, an external force F is applied to an upper surface 66 of the latch trigger 26 that is sufficient to overcome the urging of the spring 40. The external force F rotates the latch trigger 26 about the second pivot pin 38 (clockwise in FIG. 6) causing the underside 62 of the latch trigger 26 to disengage the shoulder portion 60 of the latch 24. With reference to FIG. 5, with the latch trigger 26 disengaged from the latch 24, the latch is able to be urged by the spring 36 toward its second, open position (in the direction of arrow A in FIG. 5).

In the second, open position, the latch 24 is graspable for pulling the door 16 toward its open position (in the direction of arrow B in FIG. 5). When the force F is no longer applied to the latch trigger 26, it returns to its first, closed position wherein the flange portion 64 again rests against the door 16. To close the latch 24, the force F is again applied to the latch trigger 26 to allow the shoulder portion 60 space for clearance and a force is applied to the latch 24 to overcome the urging of the spring 36. The latch 24 is returned to its closed position and the force F is released from the latch trigger 26.

Figure 3:
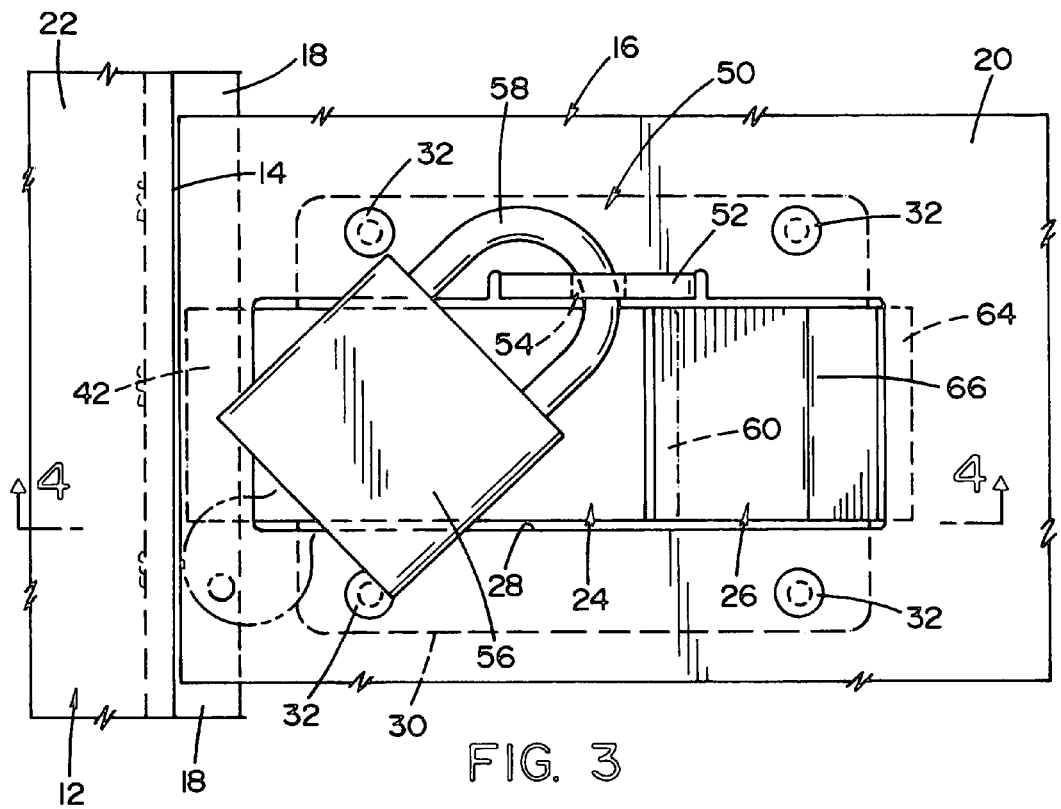
FIG. 3 is a partial top plan view of the electric arc engine welder of FIG. 1.

With reference to FIG. 3, when the lock 56 is received in the throughhole 54, the padlock 56 serves as an obstruction to the latch 24. More particularly, at least a portion of the padlock 56 is locked in close proximity to the latch 24. With additional reference to FIG. 6, the padlock 56, when connected to the tab 52, prevents the latch 24 from moving into its second, open position. Thus, the shoulder portion 42 remains generally adjacent the housing flange member 18 and, together with the portion of the door adjacent the flange member, prevents the door 16 from being moved to its open position. Thus, the lock serves as an obstruction to the latch 24 and thereby prevents the latch 24 from being moved into the latch open position. To open the door 16, the lock 56 must first be disabled or disengaged so that it is no longer obstructing the latch 24. Of course, it is to be understood that the lock of the present invention could be alternatively configured and still would be within the scope of the present invention.

In the preferred embodiment, the tab 52 is formed integrally with the door 16. More particularly, when the opening 28 is cut or lanced into the door 16, the tab 52 can be created by leaving a portion of the door 16 in the area of the opening 28 and bending or folding said portion of the door 16 to form the tab 52.

The invention has been described with reference to the preferred embodiment. Obviously, modifications and alterations will occur to others upon reading and understanding the preceding detailed description. It is intended that the invention be construed as including all such modifications and alterations insofar as they are within the scope of the appended claims and the equivalents thereof.

What is claimed is:

1. A door and latch assembly for use on an electric arc engine welder, the door and latch assembly comprising:
    a door mounted on an associated arc engine welder housing, the door movable between a door open position wherein an associated opening on the associated housing is accessible and a door closed position wherein the door covers the associated opening;
    a latch pivotally mounted on the door, the latch movable between a latch closed position wherein the latch locks the door in the door closed position and a latch open position wherein the door is movable toward the door open position;
    a latch trigger pivotally mounted on the door, the latch trigger movable between a latch trigger first position wherein the latch trigger maintains the latch in the latch closed position and a latch trigger second position wherein the latch is allowed to move from the latch closed position to the latch open position; and
    a locking device on the door adjacent the latch, the locking device locking the latch in the latch closed position when the locking device is enabled and allowing the latch to move from the latch closed position toward the latch open position when the locking device is disabled, the locking device positioned to be engaged by the latch when enabled to thereby obstruct movement of the latch and lock the latch in the latch closed position.

2. The door and latch assembly of claim 1 wherein the locking device includes:
    a lock attaching structure positioned adjacent the latch; and
    a lock releasably secured to the attaching structure when the locking device is enabled to obstruct movement of the latch from the latch closed position toward the latch open position and released from the attaching structure when the locking device is disabled.

3. The door and latch assembly of claim 2 wherein the lock attaching structure is a tab extending from the door and having a throughhole for receiving an arm of the lock.

4. A door and latch assembly for use on an electric arc engine welder, the door and latch assembly comprising:
   a door mounted on an associated arc engine welder housing, the door movable between a door open position wherein an associated opening on the associated housing is accessible and a door closed position wherein the door closes the associated opening;
   a latch rotatably mounted on the door and including a latch biasing member and a housing engagement portion, the latch biasing member urging the latch to rotate in a latch first direction, the housing engagement portion limiting movement of the door from the door closed position to the door open position;
   a latch trigger rotatably mounted on the door and including a latch trigger biasing member and a door engaging portion, the latch trigger biasing member urging the latch trigger to rotate in a latch trigger first direction, the door engaging portion limiting movement of the latch trigger in the latch trigger first direction, the latch trigger engaging the latch and limiting movement of the latch in the latch first direction, the latch trigger movable in a latch trigger second direction against the urging of the latch trigger biasing member when a sufficient force is applied to the latch trigger whereby the latch trigger disengages the latch and allows movement of the latch in the latch first direction; and
   a locking structure fixedly connected to the door and extending therefrom at a location offset relative to the latch, the locking structure having a throughhole for receiving a lock for limiting movement of the latch in the latch first direction, when the lock is received in the throughhole movement of the latch in the latch first direction is prevented by the lock engaging the latch and preventing movement thereby, when the lock is removed from the throughhole and the latch trigger is disengaged from the latch the latch biasing member moves the latch in the latch first direction such that the housing engagement portion allows movement of the door from the door closed position to the door open position.

5. An electric arc engine welder comprising:
   a housing having a cavity therein;
   a housing opening defined by the housing and connected to the cavity;
   a door mounted to the housing adjacent the housing opening, the door movable between a door closed position wherein the door closes the housing opening and a door open position wherein the cavity is accessible through the opening;
   a latch pivotally mounted on the door, the latch movable between a latch closed position wherein the latch locks the door in the door closed position and a latch open position wherein the door is movable toward the door open position; and
   a locking device adjacent the latch, the locking device directly obstructing movement of the latch from the latch closed position to the latch open position when the locking device is enabled and allowing the latch to move from the latch closed position toward the latch open position when the locking device is disabled.

6. The electric arc engine welder of claim 5 wherein the locking device includes:
   a tab extending upwardly from the door and having a throughhole; and
   a lock inserted through the tab throughhole when the locking device is enabled to obstruct movement of the latch from the latch closed position toward the latch open position and removed from the tab throughhole when the locking device is disabled.

7. The electric arc engine welder of claim 5 further including:
   a latch trigger pivotally mounted on the door, the latch trigger movable between a latch trigger first position wherein the latch trigger maintains the latch in the latch closed position and a latch trigger second position wherein the latch is allowed to move from the latch closed position to the latch open position.

8. The electric arc engine welder of claim 7 further including:
   a latch spring urging the latch toward the latch open position; and
   a latch trigger spring urging the latch trigger toward the latch trigger first position, an urging of the latch trigger spring generally greater than an urging of the latch spring.

9. The electric arc engine welder of claim 8 wherein the latch spring moves the latch from the latch closed position to the latch open position when the latch trigger is in the latch trigger second position and the locking device is disabled.

10. The electric arc engine welder of claim 8 wherein the latch trigger engages the latch to obstruct movement thereof when the latch trigger is in the latch trigger first position.

11. The electric arc engine welder of claim 5 wherein the latch includes a housing engagement portion that engages the housing when the latch is in the latch closed position thereby locking the door in the door closed position.

12. A door and latch assembly for an electric arc engine welder, comprising:
   a door operatively connected to a welder housing for providing access into the welder housing when the door is moved to a door open position;
   a latch pivotally mounted on the door, the latch movable between a latch closed position and a latch open position;
   a latch trigger pivotally mounted on the door, the latch trigger movable between a latch trigger first position wherein the latch trigger maintains the latch in the latch closed position and a latch trigger second position wherein the latch is allowed to move from the latch closed position to the latch open position;
   a locking device adjacent the latch for obstructing movement of the latch when the locking device is enabled and preventing the latch from moving to the latch open position from the latch closed position, the locking device including:
      a tab extending upwardly on the door adjacent the latch assembly;
      a hole defined through the tab; and
      a lock received through the hole when the locking device is enabled to obstruct movement of the latch and prevent the latch from moving to the open position from the closed position, the lock selectively removable from the tab for disabling the locking device.

13. The door and latch assembly of claim 12 further including:
   a latch trigger biasing member urging the latch trigger toward the latch trigger first position; and a latch biasing member urging the latch toward the latch open position.

14. The door and latch assembly of claim 13 wherein the latch includes an engaging portion that is urged into the latch trigger when the latch is in the latch closed position.

15. The door and latch assembly of claim 13 wherein the latch trigger is movable to the latch trigger second position by application of a force on the latch trigger sufficient to overcome the urging of the latch trigger biasing member.

16. The door and latch assembly of claim 13 wherein the latch trigger biasing member and the latch biasing member are a pair of torsion springs.

17. The door and latch assembly of claim 13 wherein the latch includes a welder housing engaging portion for engaging the welder housing when the latch is in the latch closed position thereby preventing the door from opening.

18. The door and latch assembly of claim 17 wherein the welder housing includes a welder housing member that extends between the door and the door engaging portion to limit pivotal movement of the door when the latch is in the latch closed position and the welder housing engaging portion engages the welder housing member.

19. The door and latch assembly of claim 13 wherein the latch trigger includes a door engaging portion that is urged into the door by the latch trigger biasing member when the latch trigger is in the latch trigger first position, an engagement between the door engaging portion and the door limits movement of the latch trigger in the latch trigger first position in a direction opposite the latch trigger second position.

20. A latch assembly on an electric arc engine welder housing, comprising:
   a latch pivotally mounted on a door of the electric arc engine welder housing by a first pivot pin and including a latch engagement portion, the latch movable from a latch closed position to a latch open position;
   a latch trigger pivotally mounted on the door by a second pivot pin and including a latch trigger engagement portion for selectively engaging the latch engagement portion, the latch trigger movable between, a latch trigger first position wherein the latch trigger engagement portion engages the latch engagement portion and a latch trigger second position wherein the latch trigger engagement portion is disengaged from the latch engagement portion, the latch trigger urging the latch toward the latch closed position when the latch trigger engagement portion engages the latch engagement portion; and
   a locking device for selectively and directly blocking movement of the latch from the latch closed position to the latch open position when the locking device is enabled.

21. The latch assembly of claim 20 further including:
   a latch trigger biasing member mounted about the second pivot pin for urging the latch trigger toward the latch trigger first position.

22. The latch assembly of claim 21 wherein the latch trigger biasing member is a torsion spring.

23. The latch assembly of claim 20 further including:
   a latch biasing member mounted about the second pivot pin for urging the latch toward the latch open position.

24. The latch assembly of claim 23 wherein the latch biasing member is a torsion spring.

25. The latch assembly of claim 23 wherein the latch trigger normally urges the latch toward the latch closed position when the trigger engagement portion engages the latch engagement portion overcoming the urging of the latch biasing member urging the latch toward the latch open position.

26. The latch assembly of claim 20 wherein the locking device includes:
   a tab defining a throughhole located adjacent the latch; and
   a lock having an arm extending through the throughhole and releasably locked to the tab, the lock obstructing movement of the latch from the latch closed position to the latch open position due to the proximity of the tab to the latch.

* * * * *